United States Patent
Hsiao et al.

(10) Patent No.: US 6,570,739 B2
(45) Date of Patent: May 27, 2003

(54) MAGNETIC HEAD HAVING WRITE HEAD ELEMENT WITH HIGH ASPECT RATIO COIL

(75) Inventors: Richard Hsiao, San Jose, CA (US); Hugo Alberto Emilio Santini, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/953,702

(22) Filed: Sep. 11, 2001

(65) Prior Publication Data

US 2002/0030928 A1 Mar. 14, 2002

Related U.S. Application Data

(62) Division of application No. 09/502,205, filed on Feb. 10, 2000.

(51) Int. Cl.[7] .................................. G11B 5/17
(52) U.S. Cl. ...................... 360/123; 360/317
(58) Field of Search ...................... 360/123, 126, 360/317, 318, 119; 29/603.14, 603.25

(56) References Cited

U.S. PATENT DOCUMENTS

| | | | | |
|---|---|---|---|---|
| 4,539,616 A | * | 9/1985 | Yuito et al. | 29/603.25 |
| 4,651,248 A | * | 3/1987 | Shiiki et al. | 360/119 |
| 4,684,438 A | | 8/1987 | Lazzari | 156/649 |
| 4,743,988 A | | 5/1988 | Sato et al. | 360/126 |
| 4,899,434 A | | 2/1990 | Roberts | 29/603 |
| 4,933,209 A | | 6/1990 | Anthony et al. | 427/116 |
| 5,034,089 A | | 7/1991 | Dee et al. | 156/633 |
| 5,059,278 A | | 10/1991 | Cohen et al. | 156/643 |
| 5,065,270 A | | 11/1991 | Koyanagi et al. | 360/123 |
| 5,448,822 A | | 9/1995 | Wu et al. | 29/603 |
| 5,566,442 A | * | 10/1996 | Gaud et al. | 29/603.14 |
| 5,703,740 A | | 12/1997 | Cohen et al. | 360/126 |
| 6,043,959 A | * | 3/2000 | Crue et al. | 360/317 |
| 6,195,232 B1 | * | 2/2001 | Cohen | 360/123 |
| 6,204,997 B1 | * | 3/2001 | Sasaki | 360/123 |
| 6,275,354 B1 | * | 8/2001 | Huai et al. | 360/123 |
| 6,404,601 B1 | * | 6/2002 | Rottmayer et al. | 360/119 |

FOREIGN PATENT DOCUMENTS

| | | |
|---|---|---|
| JP | 361276208 A | 12/1986 |
| JP | 363113812 A | 5/1988 |

OTHER PUBLICATIONS

"Thin Film Magnetic Film Head Composed of Inorganic Materials" by H. Yoshimizu et al., IEEE Transactions on Magnetics, vol. 28, No. 5, Sep. 1992.

* cited by examiner

*Primary Examiner*—Hoa T. Nguyen
*Assistant Examiner*—Tianjie Chen
(74) *Attorney, Agent, or Firm*—Robert O. Guillot; IPLO Intellectual Property Law Offices

(57) ABSTRACT

A hard disk drive of the present invention includes a magnetic head having a high aspect ratio induction coil. The magnetic head includes a first pole tip piece that is formed upon a first magnetic pole and a second pole tip piece that is part of the second magnetic pole, where the write gap is formed between the first pole tip piece and the second pole tip piece. The use of the two pole tip pieces increases the spacing between the first magnetic pole layer and the second magnetic pole layer such that an induction coil having high aspect ratio coil turns can be formed within the insulation layers. A reactive ion etch (RIE) process is used to form the coil trenches within which the high aspect ratio coil turns are created. An RIE etch stop layer is formed upon the first magnetic pole layer to prevent the RIE etch process from creating coil turn trenches that make contact with the first magnetic pole layer. Where high aspect ratio coil pattern is formed, a finer pitch coil is fabricated, such that the yoke length of the magnetic head is reduced and the flux rise time of the magnetic head is decreased, whereby the magnetic head has an increased data writing rate.

18 Claims, 9 Drawing Sheets

MAGNETIC HEAD HAVING WRITE HEAD ELEMENT WITH HIGH ASPECT RATIO COIL

CROSS REFERENCE TO RELATED APPLICATION

This application is a divisional application of copending U.S. patent application Ser. No. 09/502,205, filed Feb. 10, 2000.

BACKGROUND OF THE INVENTION

1. Field of the Invention

The present invention relates generally to magnetic heads that are utilized with thin film hard disk data storage devices, and more particularly to the design and fabrication of write head elements that are utilized in such magnetic heads.

2. Description of the Prior Art

It is a goal of the hard disk drive industry to develop magnetic heads that provide ever faster data writing speeds, such that increased quantities of data can be written onto the hard disk in shorter periods of time. Typical magnetic heads include two magnetic pole pieces having a narrow writing gap formed between the tips of the two pole pieces. Magnetic flux is caused to flow across the gap which causes changes in a thin film magnetic layer formed on a hard disk that is located proximate the gap. An induction coil is formed between the magnetic pole pieces to create a magnetic field between the pole pieces, and changes in the electric current that flows through the induction coil create changes in the magnetic flux that flows through the two pole pieces, whereby the magnetic flux that flows across the write gap is created. One of the parameters that controls the rate at which data can be written is the rate with which magnetic flux changes can be made by the write head. This flux change rate is in part controlled by the magnetic flux rise time of the write head, and the physical geometry of the write head is one of the significant parameters that determines the magnetic flux rise time. Generally, a second magnetic pulse cannot successfully be initiated until the first magnetic pulse had reached a value near its peak, and the magnetic flux rise time is the time necessary for a magnetic pulse to reach this value. Therefore, if the magnetic flux rise time can be shortened, the data writing rate of a magnetic head can be increased.

Prior art magnetic heads have been fabricated with induction coils having multiple layers and torroidal coil turn designs, amongst others, in an effort to alter the physical geometry of the write head components such that the magnetic flux rise time is shortened. However, these prior art approaches generally cannot produce very fine pitch coils and short yoke lengths. The present invention utilizes a different fabrication method to achieve physical geometries for write head pole components that shorten the magnetic flux rise time of the write head element of a magnetic head, such that the data writing rate of the magnetic head is increased.

SUMMARY OF THE INVENTION

A hard disk drive of the present invention includes a magnetic head having a high aspect ratio induction coil. The magnetic head includes a first pole tip piece that is formed upon a first magnetic pole and a second pole tip piece that is part of the second magnetic pole, where the write gap is formed between the first pole tip piece and the second pole tip piece. The use of the two pole tip pieces increases the spacing between the first magnetic pole layer and the second magnetic pole layer such that an induction coil having high aspect ratio coil turns can be formed within the insulation layers. A reactive ion etch (RIE) process is used to form the coil trenches within which the high aspect ratio coil turns are created. An RIE etch stop layer is formed upon the first magnetic pole layer to prevent the RIE etch process from creating coil turn trenches that make contact with the first magnetic pole layer. Where high aspect ratio coil pattern is formed, a finer pitch coil is fabricated, such that the yoke length of the magnetic head is reduced and the flux rise time of the magnetic head is decreased, whereby the magnetic head has an increased data writing rate.

It is an advantage of the magnetic head of the present invention that it is fabricated with high aspect ratio induction coil turns between the magnetic poles of the write head element.

It is another advantage of the magnetic head of the present invention that the yoke length of the second magnetic pole of the write head element is reduced.

It is a further advantage of the magnetic head of the present invention that the magnetic flux rise time of the write head element is shortened.

It is yet another advantage of the magnetic head of the present invention that an increase in the data writing rate is achieved.

These and other features and advantages of the present invention will become well understood by those skilled in the art upon reading the following detailed description which makes reference to the several figures of the drawing.

IN THE DRAWINGS

DETAILED DESCRIPTION OF THE PREFERRED EMBODIMENTS

Figure 1:
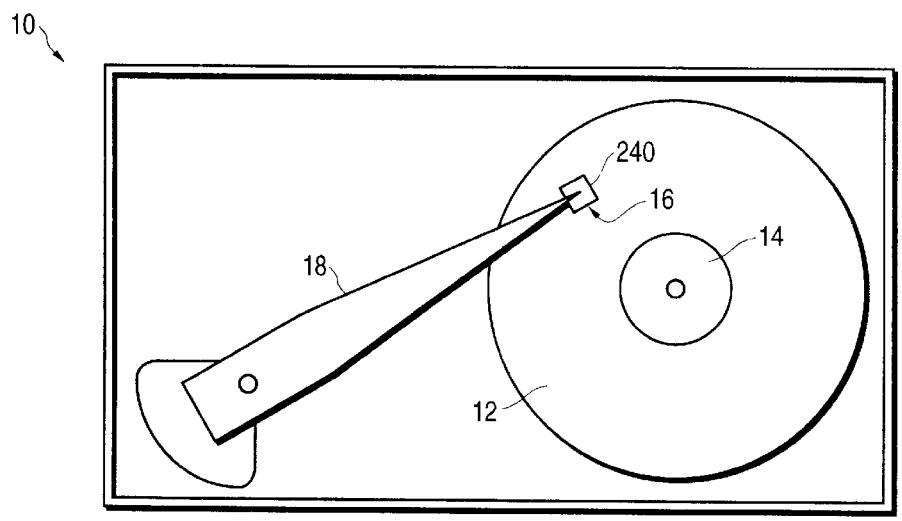
FIG. 1 is a simplified top plan view of a hard disk drive device including the magnetic head of the present invention.

Magnetic heads such as the magnetic head 240 of the present invention are utilized to read and write data to magnetic media, such as hard disks in hard disk drive devices. A simplified top plan view of a hard disk drive 10 is presented in FIG. 1, wherein at least one hard disk 12 is rotatably mounted on a motorized spindle 14. A slider 16, having a magnetic head 240 formed thereon, is mounted upon an actuator arm 18 to fly above the surface of each rotating hard disk 12, as is well known to those skilled in the art. The present invention includes improved features and manufacturing methods for such magnetic heads 240.

Figure 2:
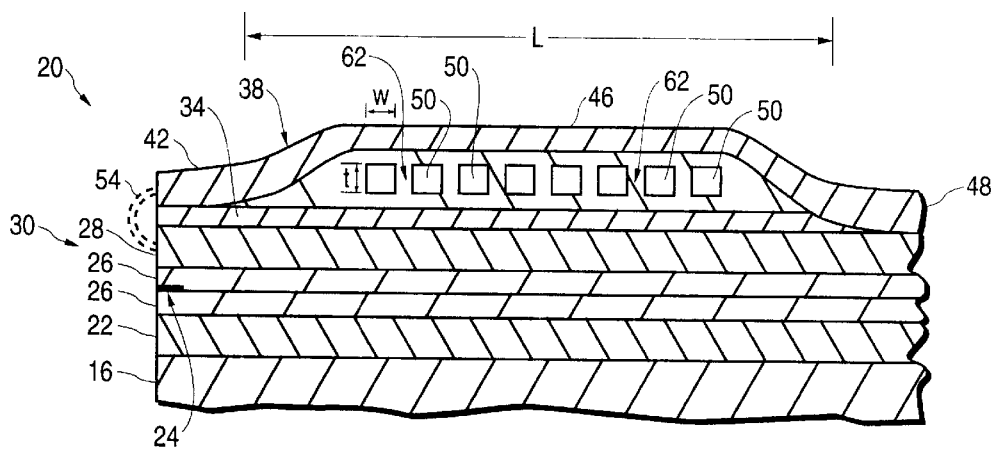
FIG. 2 is a side cross-sectional view of a prior art magnetic head, as is well known to those skilled in the art.

A cross-sectional view of a typical prior art magnetic head 20 is provided in FIG. 2. The prior art head 20 includes a slider body portion 16, a first read element shield 22, a read element 24 formed within an insulator layer 26, and a second read element shield 28 which also serves as a magnetic first pole of a write head, where a merged head is being fabricated following the fabrication of the second read element shield. In non-merged head designs a separate first magnetic pole (not shown) is fabricated. The write head portion 30 includes the first magnetic pole 28, a write gap layer 34 and a second magnetic pole 38. The second magnetic pole 38 includes a second magnetic pole tip 42 and a yoke portion 46. The yoke 46 is electromagnetically connected with the first pole 28 through a back piece 48. An induction coil, depicted as coil turns 50, is formed between the first magnetic pole 26 and the yoke 46 of the second magnetic pole 38 to create a magnetic flux 54 that flows across the gap 34 between the first magnetic pole 28 and the second pole tip 42 in response to electrical current that flows through the induction coil 50. The rate of change of the magnetic flux 54 limits the data writing rate of the magnetic head, and the magnetic flux change rate is in turn determined by the magnetic flux rise time of the magnetic poles. Where the magnetic flux rise time is decreased the data writing rate is increased. These structures and features are well known to those skilled in the art.

One of the physical parameters that controls the magnetic flux rise time is the length L of the yoke 46 between the pole tip 42 and the back piece 48. Basically, where the length L of the yoke is reduced, the magnetic flux flow path is reduced, and the magnetic flux rise time is thereby decreased. However, the yoke length cannot arbitrarily be shortened because several induction coil turns 50 must pass beneath the yoke 46 in order to provide the electromagnetic energy to the yoke that induces the magnetic flux within it. Therefore, a limiting factor in shortening the length L of the yoke 46 is that the induction coils 50 must fit under the yoke, and the cross-sectional shape of the coil turns, together with the insulation space 62 required between the coil turns thereby controls the length L of the yoke. The magnetic head 240 of the present invention includes high aspect ratio coil turns, such that the width W of individual coil turns 50 is minimized while the thickness t of the coil turns is increased. As a result, the total conduction area of a coil turn is not significantly reduced, and undesired excessive heating ($I^2R$) can be minimized. The coil of the magnetic head of the present invention thus has a finer pitch (coil turn to coil turn distance), and a magnetic head 240 with a shortened yoke 46 is thereby achieved. As a result, the magnetic head 240 of the present invention thus has a decreased magnetic flux rise time and therefore achieves a faster data writing rate.

Figure 3:
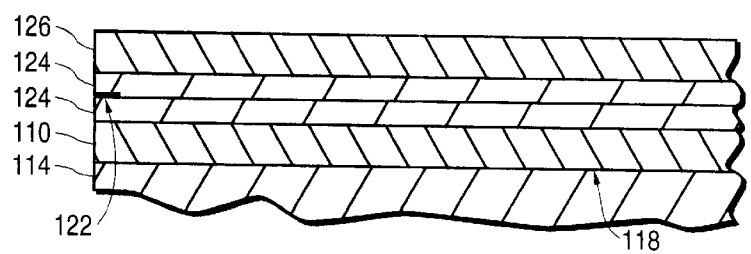
FIGS. 3–21 are schematic sectional views depicting the fabrication steps of the write head element of the magnetic head of the present invention.

FIGS. 3 through 21 depict the various manufacturing process steps that are undertaken to fabricate the high aspect ratio fine pitch coil of the magnetic head 240 of the present invention. FIG. 3 provides a starting point in the description of the present invention. As depicted therein, a first read head shield 110 is disposed upon a surface 118 of a slider body 114. A read head element 122 is formed in insulation layers 124 upon the first shield 110 and a second read head shield 126 is formed upon the read head element 122. As described above, this basic structure of FIG. 3 is well known, and a detailed description of its various structural details is not necessary to an understanding of the present invention. That is, the present invention can be utilized with various read head elements.

Figure 4:
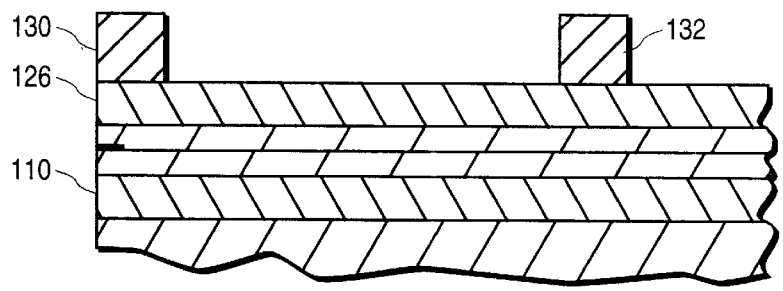

Thereafter, as depicted in FIG. 4, a P1 pole tip 130 and a back piece 132 are formed upon the S2 layer 126 in electromagnetic connection therewith, where the S2 layer 126 also serves as the first magnetic pole (P1) layer. The P1 pole tip 130 and the back piece 132 are preferably composed of a high magnetic moment substance such as NiFe (45/55). Well known photolithographic process steps are utilized to form the P1 pole tip 130 and the back piece 132, including the deposition of a seed layer, depositing a photoresist layer, patterning and developing of the photoresist layer and the electroplating of the P1 pole tip 130 and back piece 132 onto the P1 layer 126 in electromagnetic interconnection therewith. Thereafter, the remaining photoresist layer is removed, such that the P1 pole tip 130, the back piece 132 and the P1 surface are exposed.

Figure 5:
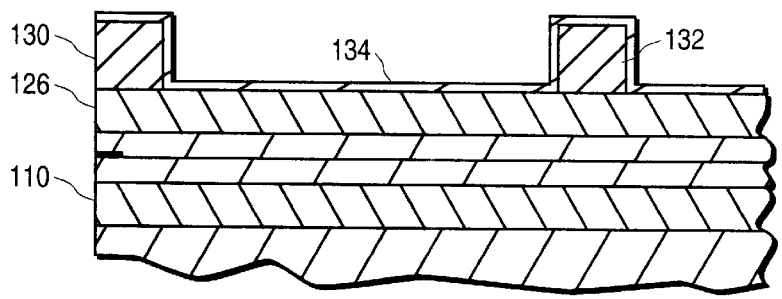
Figure 6:
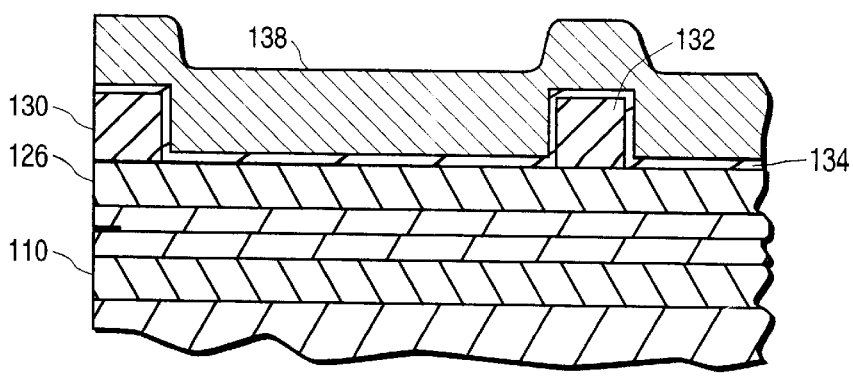
Figure 7:
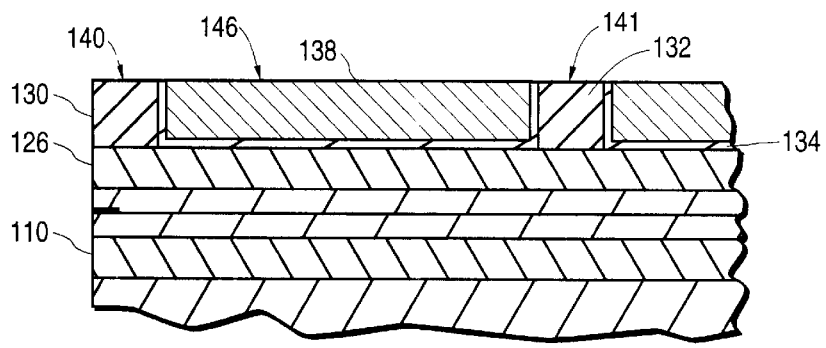

As depicted in FIG. 5, a thin film insulator layer 134 is next deposited upon the device depicted in FIG. 4. The thin film layer 134 is composed of a robust material, such as alumina, that will act as an etch stop material in a subsequent reactive ion etch (RIE) etching process that is described herebelow. Thereafter, as depicted in FIG. 6, an insulation material layer 138 is deposited. Exemplary materials of the insulation layer 138 include $SiO_2$ and polymeric materials such as hard baked novolac or F-containing low k polymer, or similar insulation materials that can be readily etched in the RIE process that is to be conducted later. Thereafter, as depicted in FIG. 7, a CMP process is undertaken to planarize the structure depicted in FIG. 6, such that the upper surface 140 of the P1 pole tip 130, and the upper surface 141 of the back piece 132 are exposed.

Figure 8:
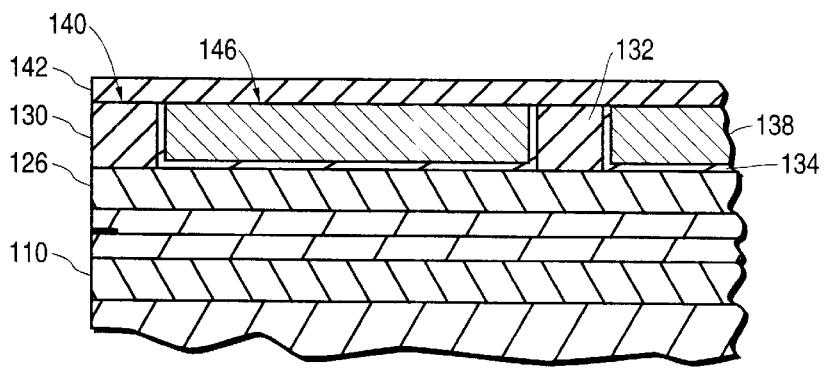
Figure 9:
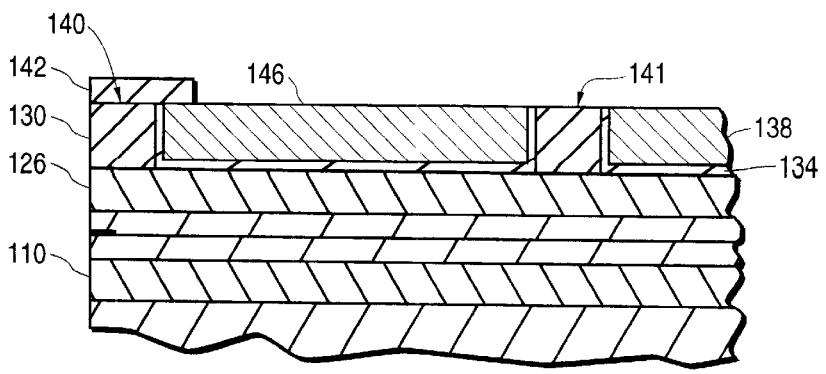

As depicted in FIG. 8, a write gap layer 142 is next deposited upon the planarized surface 146 of the structure. Portions of the write gap layer 142 are then removed in a patterned etch step, such that the remaining write gap layer 142 only covers the surface 140 of the P1 pole tip 130 as is depicted in FIG. 9.

Figure 10:
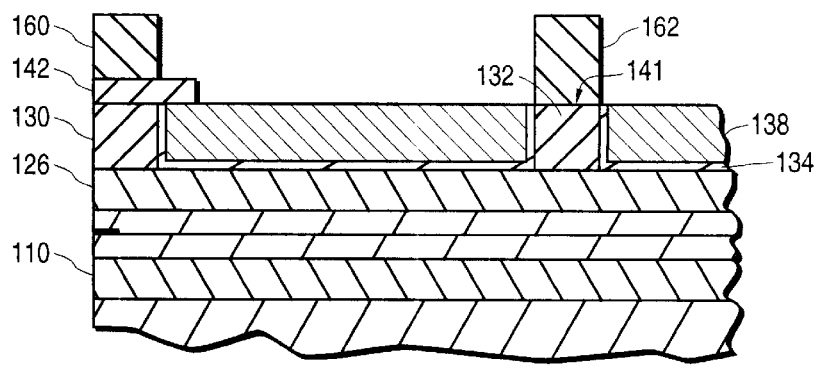
Figure 11:
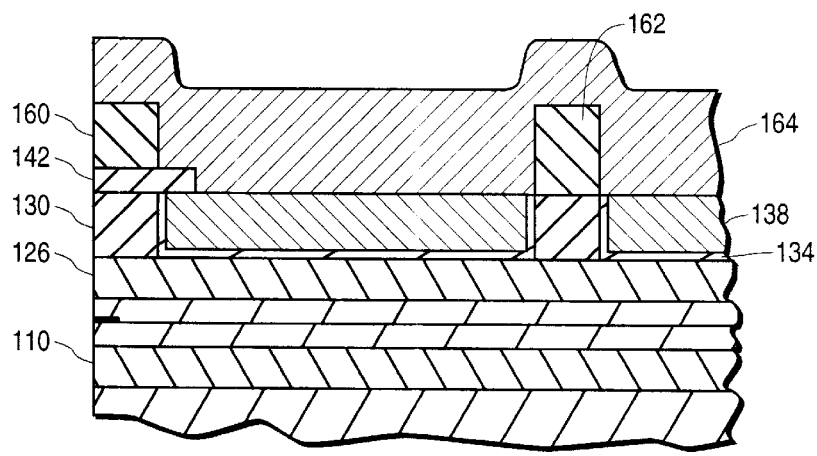

A second magnetic P2 pole tip piece 160 is next formed upon the write gap layer 142, and a second back piece 162 is formed upon the surface 141 of the first back piece 132, as depicted in FIG. 10. Standard photolithographic process steps are utilized to fabricate the P2 pole tip 160 upon the write gap layer 142 and the back piece 162, and a detailed description of the process steps is not necessary as they are well known to those skilled in the art. The steps include the deposition of a seed layer, a photoresist layer that is subsequently patterned and the electroplating of the P2 pole tip 160 and back piece 162 into the patterned photoresist layer, followed by the removal of the photoresist layer and seed layer. Thereafter, as depicted in FIG. 11, the second pole piece 160 and back piece 162 are covered by an insulation material layer 164 that is susceptible to RIE image transfer. Exemplary materials of the layer 164 include the materials that were utilized in forming the first insulation layer 138, including $SiO_2$ and polymeric materials such as hard baked novolac or F-containing low k polymer. Preferably the layers 164 and 138 are composed of the same material. Thereafter, a CMP process is undertaken as depicted in FIG. 12 to planarize the upper surface 168 of the structure depicted in FIG. 11 and to expose the top surface 170 of the P2 pole tip 160 and the top surface 172 of the back piece 162.

Figure 12:
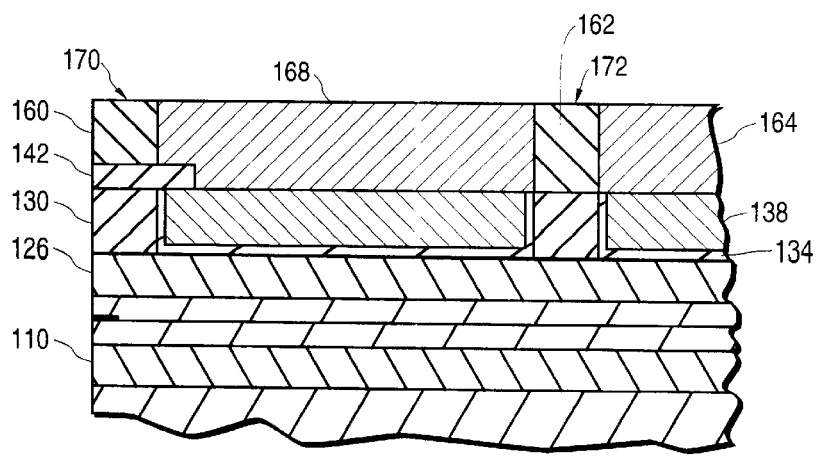
Figure 13:
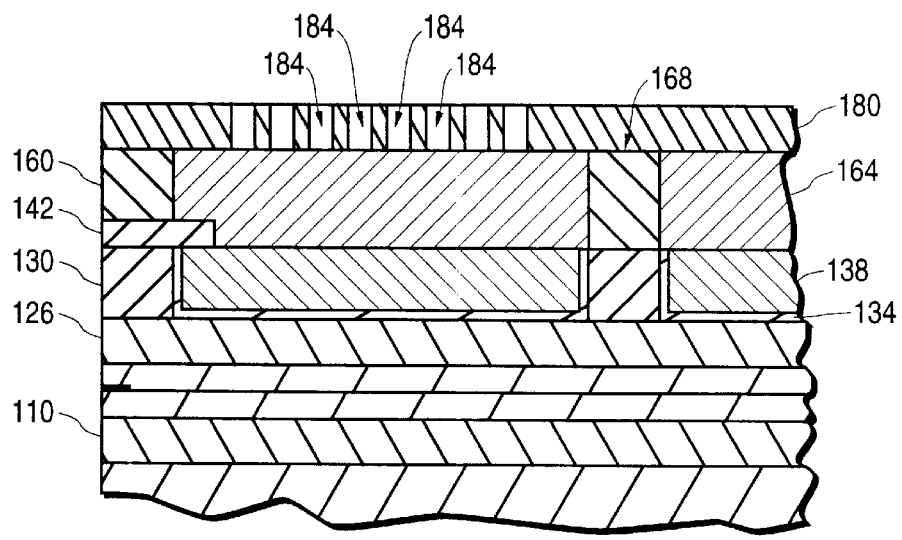

As depicted in FIG. 13, a thin hardmask 180 containing the fine pitch coil pattern 184 of the present invention is then fabricated upon the upper surface 168 of the structure depicted in FIG. 12. An $SiO_2$ hardmask 180 can be utilized for image transfer into the layers 164 and 138 if they are composed of a polymer material, and an Al2O3 or NiFe hardmask layer 180 is preferably used for RIE image transfer where the layers 164 and 138 are composed of $SiO_2$. Basically, the hardmask layer 180 must be etched much slower than the layers 164 and 138 where all are exposed to RIE.

Figure 14:
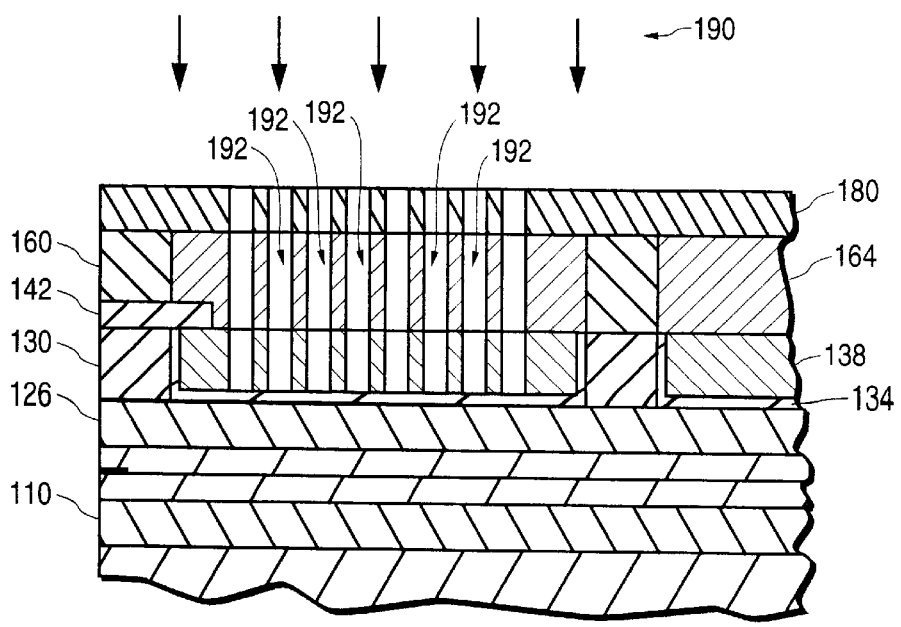

Thereafter, as depicted in FIG. 14, an RIE etching process 190 is performed to etch the coil pattern 184 into the insulation layers 164 and 138. The RIE etching process 190 is conducted to create the coil trench pattern 192 downward until the etch stop layer 134 is reached. Alternatively, the RIE etching process can be undertaken for a fixed period of time, wherein the etch stop layer 134 serves to assure that the RIE etching does not reach down to the P1 layer 126. Without the presence of the etch stop layer 134, the coil pieces could be electrically shorted through contact with the P1 layer 126.

Figure 15:
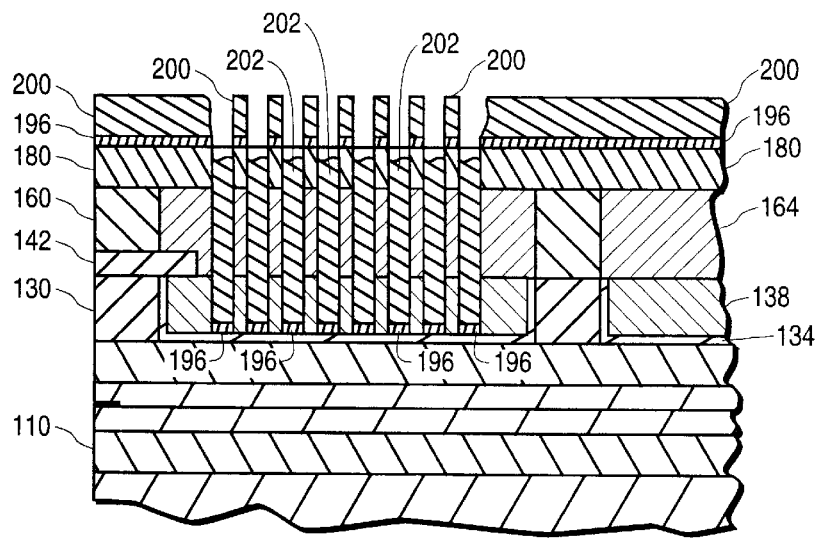
Figure 16:
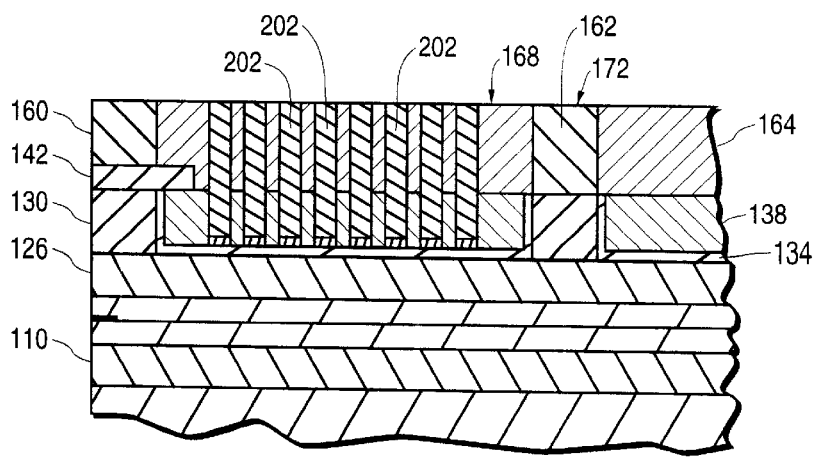
Figure 17:
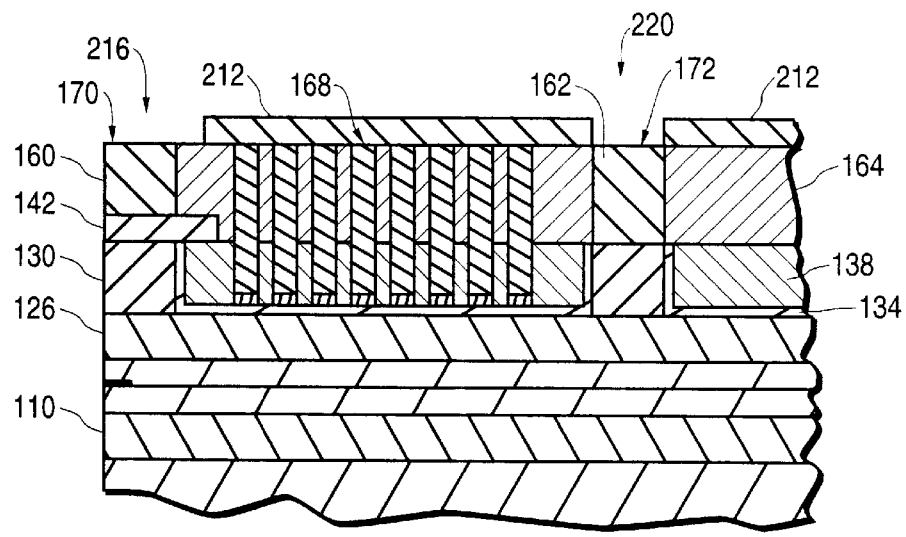
Figure 18:
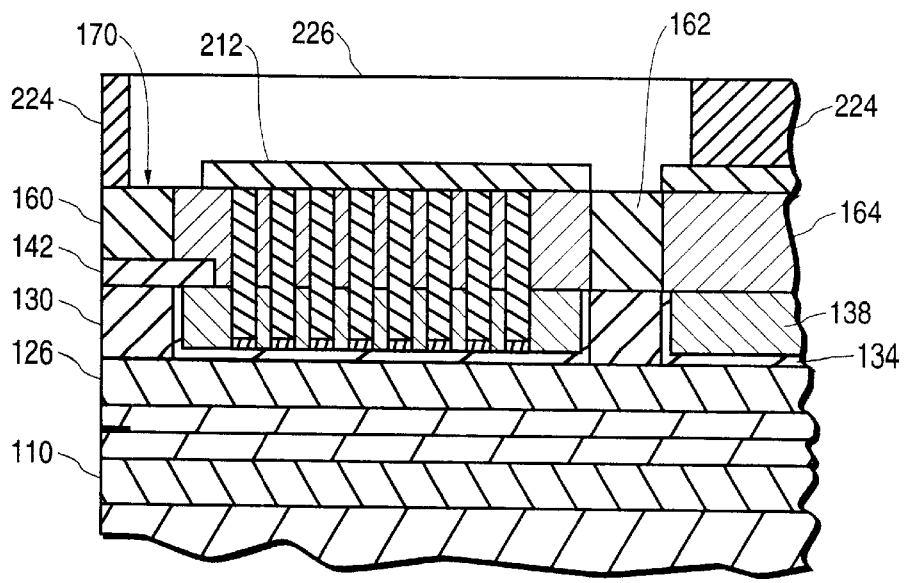
Figure 19:
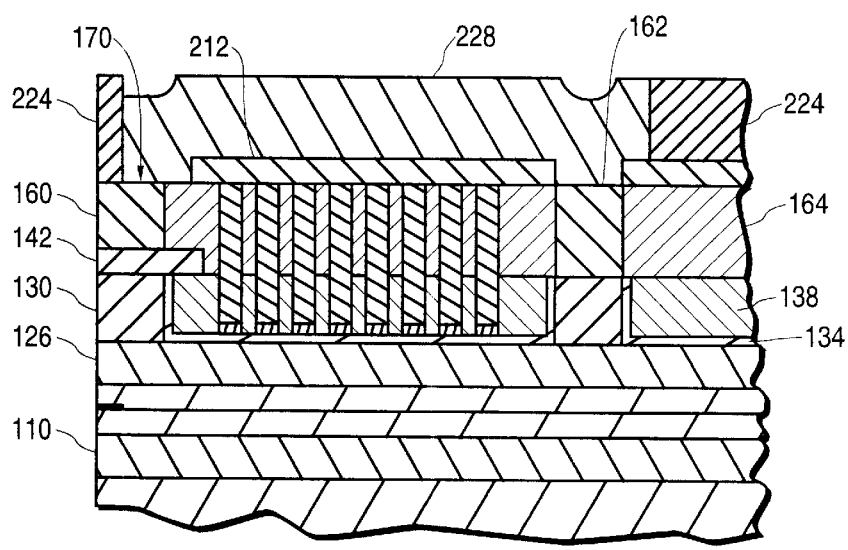
Figure 20:
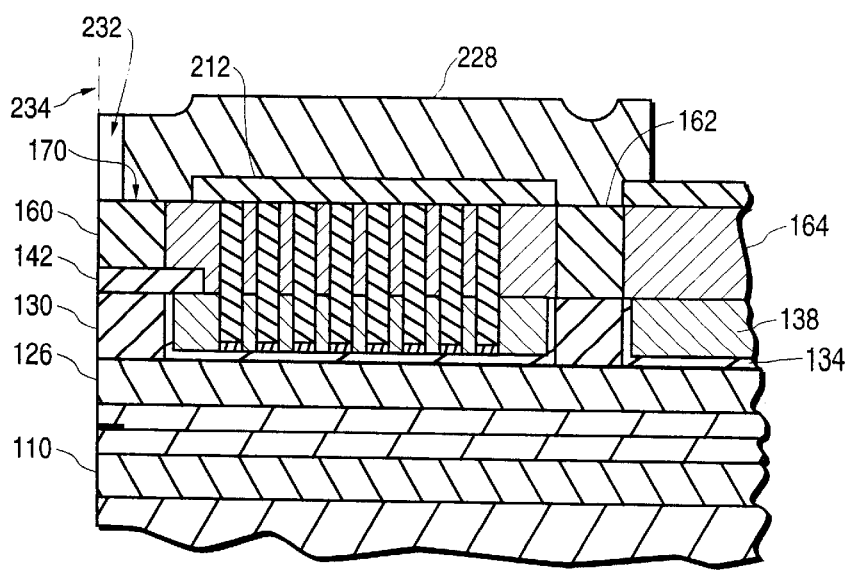
Figure 21:
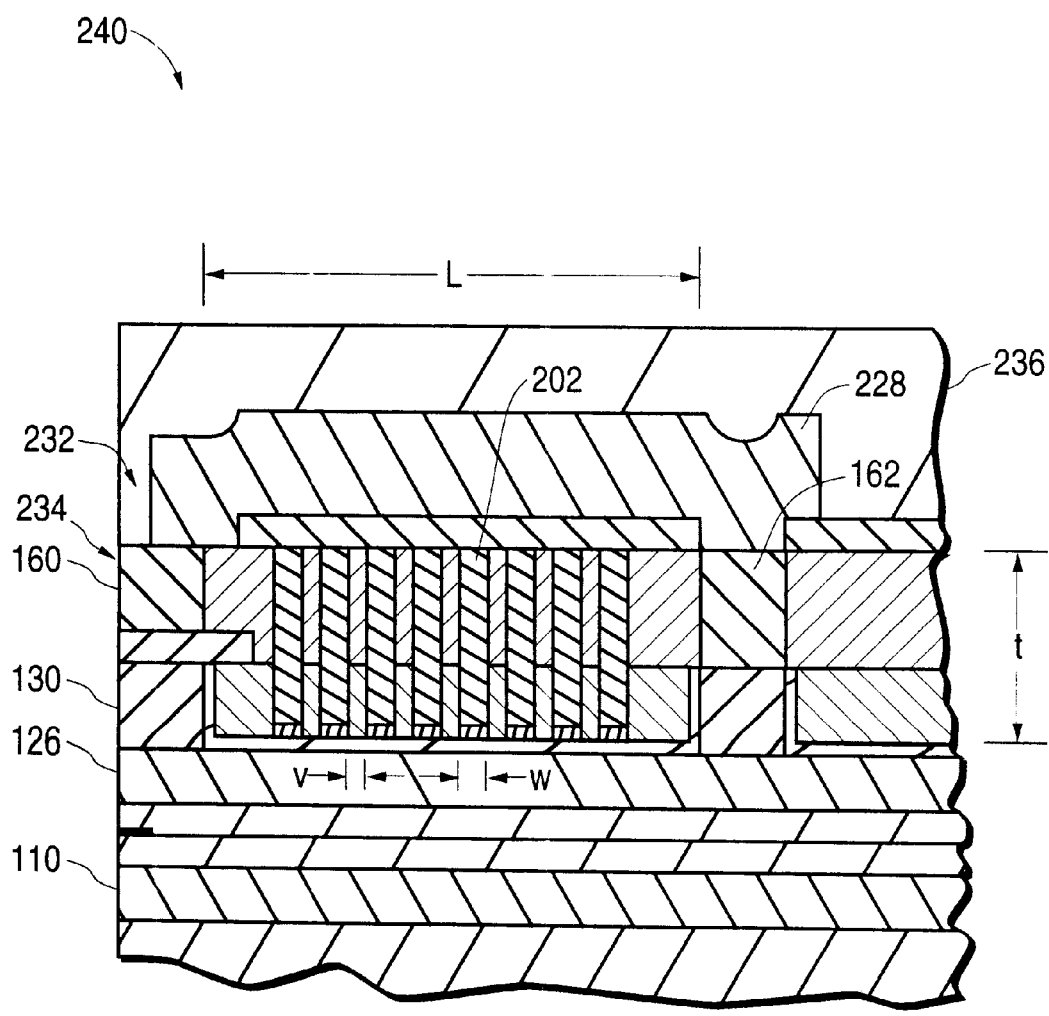

Thereafter, as depicted in FIG. 15, a seed layer 196 (such as tantalum/copper) is first deposited, followed by electroplating a coil layer 200 of the individual coil turns 202 (typically formed with copper) to fill the coil trench pattern 192 that was etched into the insulative layers 164 and 138. A CMP process is next performed as is depicted in FIG. 16, to remove the excess plated copper 200 and the mask 180 from the top surface 168 of the insulator layer 164. Next, as depicted in FIG. 17, a patterned insulative layer 212 is deposited upon the upper surface 168 of the coil pattern with an opening 216 formed therein to provide for electromagnetic connection of a yoke member to the surface 170 of the P2 pole tip 160, and an opening 220 for creating a back electromagnetic interconnection with the yoke to be formed. Thereafter, as depicted in FIG. 18, using well known photolithographic techniques, a patterned photoresist layer 224 is deposited, with a yoke trench 226 formed therein. As shown in FIG. 19, the yoke portion 228 of the second magnetic pole layer is then electroplated onto the device to electromagnetically connect the P2 pole tip 160 with the back piece 162. After the yoke 228 is fabricated, the resist layer is removed, as is depicted in FIG. 20. A gap or recess 232 is preferably formed between the yoke 228 and the air bearing surface 234 that will ultimately be formed, as is well understood by those skilled in the art. Finally, further fabrication steps as are known in the art are then utilized to produce the lead/stud connections and the encapsulation 236 of the completed magnetic head 240, which encapsulation fills the recess 232.

In a typical embodiment, the P1 pole tip 130 and P2 pole tip 160 have thicknesses of approximately 2 microns, such that the thickness t of the coil turns 202 is approximately 4 microns. The width w of the coil turns 202 can be from approximately 0.25 microns to approximately 1.25 microns, and an insulation width v of approximately 0.25 microns is sufficient to separate the coil turns, such that the coil pitch of the present invention is from approximately 0.5 microns to approximately 1.5 microns. The aspect ratio (t/w) of the coil turns 202 is from approximately 16 to approximately 3.2.

As can now be understood, each of the coil turns 202 has a relatively narrow width w and a relatively large thickness t, such that each of the coil turns 202 has a relatively high aspect ratio (t/w); however, the overall cross-sectional area of each of the coil turns 202 remains at least as large as the prior art devices, such that the coil turns 202 possess good electrical conductivity which is important for a high, rapid magnetic flux creation. Because the coils 202 have a narrow width w, the pitch (or coil turn to coil turn distance) is reduced. As indicated above, the reduction in the coil pitch means that the same number of coil turns 202 will fit in a shorter space, such that the length L of the yoke 228 between the pole tip 160 and the back iron 162 is shortened, and the shortened yoke leads to a faster magnetic flux rise time, such that a higher data writing rate is obtained.

While the invention has been shown and described with reference to certain preferred embodiments, it will be understood by those skilled in the art that certain alterations and modifications in form and detail can be made therein without departing from the true spirit and scope of the invention. It is therefore intended by the inventors that the following claims cover all such alterations and modifications that nevertheless include the true spirit and scope of the invention.

What is claimed is:

1. A magnetic head, comprising:
   a first magnetic pole, including a projecting first pole piece;
   a write gap layer being formed upon said first pole piece;
   a second magnetic pole, including a projecting second pole piece that is disposed upon said write gap layer;
   an induction coil including a plurality of coil turns, said coil turns being disposed between said first magnetic pole and said second magnetic pole;
   wherein said first pole piece has a thickness, and wherein said second pole piece has a thickness, and wherein a first electrical insulation layer is formed in a magnetic head layer that includes said first pole piece, and wherein a second electrical insulation layer is formed in a magnetic head layer that includes said second pole piece, and
   wherein said coil turns are disposed within both said first electrical insulation layer and said second electrical insulation layer, such that said coil turns have a thickness that is approximately equal to the total of said first pole piece thickness and said second pole piece thickness.

2. A magnetic head, as described in claim 1 wherein an etch stop layer is disposed upon said first magnetic pole, and said first electrical insulation layer is disposed upon said etch stop layer, and wherein said coil turns are disposed upon said etch stop layer.

3. A magnetic head as described in claim 2, wherein a third electrical insulation layer is disposed on top of said coil turns, and wherein said second magnetic pole is disposed upon said third insulation layer.

4. A magnetic head as described in claim 3 wherein said coil turns have a width of from approximately 0.25 microns to approximately 1.25 microns, and said coil turns have a thickness of approximately 4 microns.

5. A magnetic head as described in claim 4 wherein said coil turns have a pitch of approximately 0.5 microns to approximately 1.5 microns, and wherein said coil turns have an aspect ratio of from approximately 3.2 to approximately 16.

6. A magnetic head as described in claim 2 wherein said first electrical insulation layer and said second electrical insulation layer are comprised of $SiO_2$.

7. A magnetic head as described in claim 6, wherein said etch stop layer is comprised of $Al_2O_3$.

8. A magnetic head as described in claim 2 wherein said first electrical insulation layer and said second electrical insulation layer are comprised of an organic polymer.

9. A magnetic head as described in claim 8, wherein said etch stop layer is comprised of a substance selected from the group consisting of $SiO_2$ and $Al_2O_3$.

10. A hard disk drive, comprising:
    at least one hard disk being adapted for rotary motion upon a disk drive;
    at least one slider device having a slider body portion being adapted to fly over said hard disk;
    a magnetic head being formed on said slider body for writing data on said hard disk; said magnetic head including:
    a first magnetic pole, including a projecting first pole piece;
    a write gap layer being formed upon said first pole piece;
    a second magnetic pole, including a projecting second pole piece that is disposed upon said write gap layer;
    an induction coil including a plurality of coil turns, said coil turns being disposed between said first magnetic pole and said second magnetic pole;
    wherein said first pole piece had a thickness, and wherein said second pole piece has a thickness, and wherein a first electrical insulation layer is formed in a magnetic head layer that includes said first pole piece, and wherein a second electrical insulation layer is formed in a magnetic head layer that includes said second pole piece, and wherein said coil turns are disposed within both said first electrical insulation layer and said second electrical insulation layer; such that said coil turns have a thickness that is approximately equal to the total of said first pole piece thickness and said second pole piece thickness.

11. A hard disk drive, as described in claim 10 wherein an etch stop layer is disposed upon said first magnetic pole, and said first electrical insulation layer is disposed upon said etch stop layer, and wherein said coil turns are disposed upon said etch stop layer.

12. A hard disk drive as described in claim 11, wherein a third electrical insulation layer is disposed on top of said coil turns, and wherein said second magnetic pole is disposed upon said third insulation layer.

13. A hard disk drive as described in claim 12 wherein said coil turns have a width of from approximately 0.25 microns to approximately 1.25 microns, and said coil turns have a thickness of approximately 4 microns.

14. A hard disk drive as described in claim 13 wherein said coil turns have a pitch of approximately 0.5 microns to approximately 1.5 microns, and wherein said coil turns have an aspect ratio of from approximately 3.2 to approximately 16.

15. A hard disk drive as described in claim 11 wherein said first electrical insulation layer and said second electrical insulation layer are comprised of $SiO_2$.

16. A hard disk drive as described in claim 15, wherein said etch stop layer is comprised of $Al_2O_3$.

17. A hard disk drive as described in claim 11, wherein said first electrical insulation layer and said second electrical insulation layer are comprised of an organic polymer.

18. A hard disk drive as described in claim 17, wherein said etch stop layer is comprised of a substance selected from the group consisting of $SiO_2$ and $Al_2O_3$.

* * * * *